United States Patent Office 3,451,124
Patented June 24, 1969

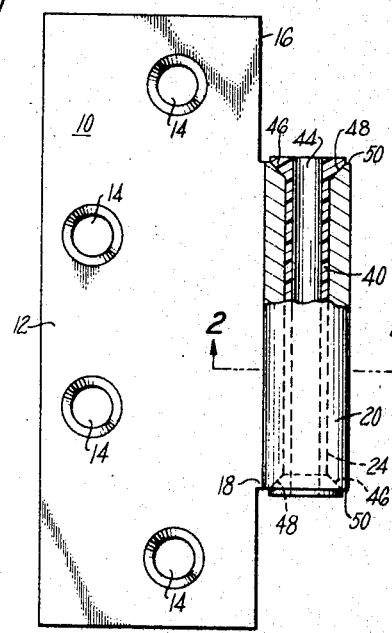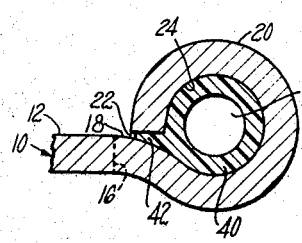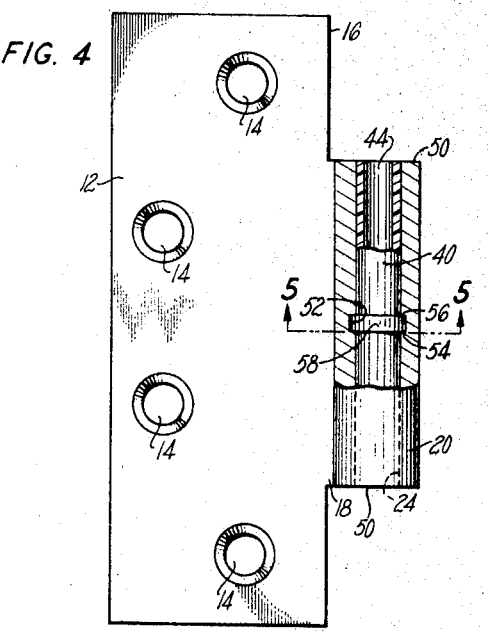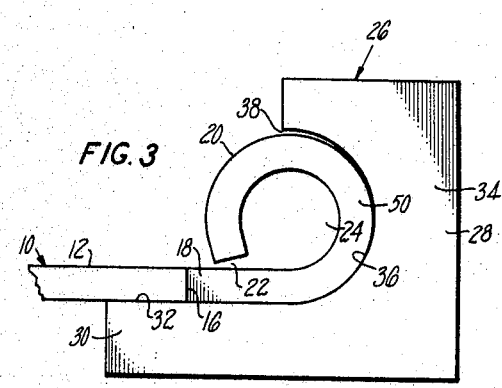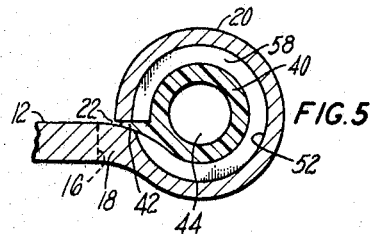
INVENTORS
WILLIAM A. STEINER
JOHN S. PARSONS

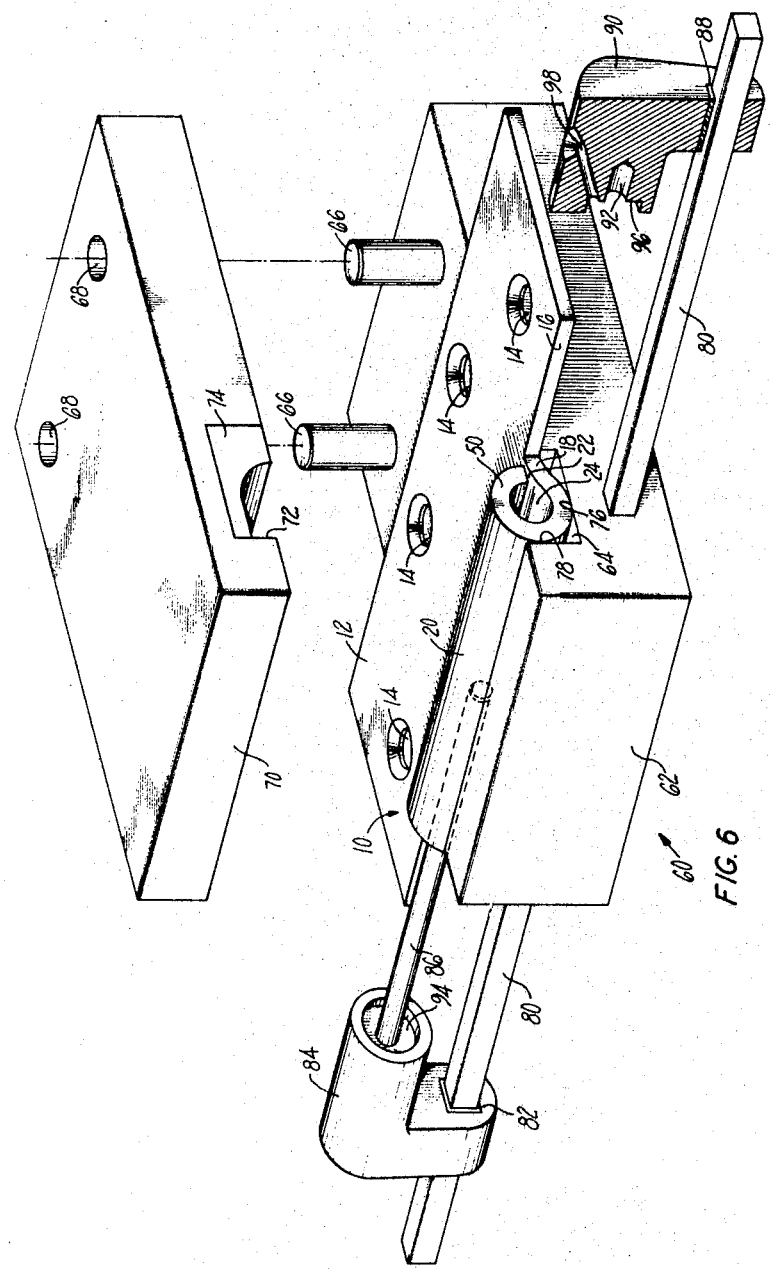

3,451,124
METHOD OF MAKING A HINGE ASSEMBLY
William A. Steiner, Manchester, and John S. Parsons, West Hartford, Conn., assignors to The Stanley Works, New Britain, Conn., a corporation of Connecticut
Filed Aug. 7, 1964, Ser. No. 388,043
Int. Cl. B23k *19/00;* B23p *17/00*
U.S. Cl. 29—527.1                  6 Claims

ABSTRACT OF THE DISCLOSURE

A hinge assembly is made by forming a hinge leaf with at least one knuckle attached. A moldable plastic material is then formed in place to form a sleeve bearing that conforms to the internal irregularities of the knuckle.

---

The present invention relates to improvements in hinges of the type having a pair of leaves possessing inter-fitting knuckles. More particularly, it relates to such hinges having a new and improved bearing assembly and to the method and apparatus of manufacturing such assemblies.

It is an object of the present invention to provide a novel hinge assembly having a sleeve bearing which not only compensates for the irregularities and eccentricities of the knuckle bore, but also effectuates accurate alignment of the pin-receiving bore of the knuckle while obviating the necessity of costly machining operations.

A further object of the present invention is to provide a facile and economical process for forming hinges having knuckles possessing interlocked bearings of high lubricity which assist in precisely aligning the mating knuckles irrespective of manufacturing variations and irregularities caused during the formation of the knuckle.

Another object of the invention is to provide an improved hinge of the rolled knuckle type, which facilitates the application of uniform metallic plating by conventional methods, particularly in those areas adjacent the knuckle.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is an elevational plan view, partially broken away, of a hinge leaf of the present invention;

FIG. 2 is an enlarged sectional view of the knuckle portion of the hinge leaf taken along the line 2—2 of FIG. 1;

FIG. 3 is a side elevational view diagrammatically illustrating a method of forming a rolled knuckle;

FIG. 4 is an elevational plan view, partially broken away of another embodiment of a hinge leaf of the present invention;

FIG. 5 is an enlarged sectional view taken along the line 5—5 of FIG. 4; and

FIG. 6 is a perspective view, partially disassembled and partially in section, of an apparatus suitable for use in the manufacture of the hinge and bearing assembly of the present invention.

Referring now to the drawings in detail wherein like referenced characters indicate like parts throughout the several figures, and particularly to FIG. 1, there is shown a hinge leaf, generally designated 10, produced in accordance with the present invention. The leaf 10 consists of a generally rectangular, flat mounting plate 12 possessing a plurality of countersunk apertures 14 which facilitate the mounting of plate 12 to a support, such as the jamb of a door frame. Integrally connected to plate 12 along a portion of its longitudinal edge 16 and through a connecting area 18 is a generally cylindrical hinge knuckle or barrel 20. Area 18 is preferably located outwardly from the edge 16 thereby permitting sufficient clearance for complementary inter-fitting knuckles. In the embodiment chosen for illustrative purposes, the knuckle 20 is of the rolled type and consequently possesses a longitudinally extending gap or slot 22, as best shown in FIG. 2, at the juncture of the plate 12 and knuckle 20.

The gap 22 at area 18 substantially detracts from the general appearance of the hinge leaf. Additionally, irregularities and eccentricities in the rolled knuckle resulting inherently from the process of formation of the knuckle have required that most rolled knuckles have their central bores 24 aligned by reaming or similar operations in order that the hinge pin retain the interfitting knuckles in proper alignment. The thickness and hardness characteristics of the material used have caused further difficulties in removing these irregularities, particularly due to the inherent spring in the free edge of the rolled knuckle.

Referring now to FIG. 3, there is diagrammatically illustrated an apparatus, generally designated 26, utilized in forming the rolled knuckle 20 of a hinge leaf 10. The apparatus comprises a single piece knuckle-forming block or die 28 possessing a runway portion 30 having a generally flat top surface 32 and a forming portion 34 containing an arcuate, semicircular surface 36 extending upwardly from surface 32 and constituting a continuation thereof. In operation a generally T-shaped, flat metal plate is forced, stem first, along the flat top surface 32 toward arcuate surface 36 causing the stem to bend in a conforming manner to the configuration of surface 36 and result in the rolled knuckle 20. In practice the free forward end of the stem is initially formed or bent prior to the rolling operation in order to facilitate the movement thereof along the surface 36. Generally, the initial or first bend does not completely conform to the curvature of surface 36 causing in the rolled knuckle a slight lack of true roundness which is most pronounced adjacent the longitudinal slot 22 of the knuckle and also results in a gap 38 at the exit point of the die 28. Where desired the leaf 10 may subsequently be swaged to produce the configuration illustrated in FIG. 2.

Additionally, it has been observed that the rolled knuckle causes substantial difficulty in applying uniform plated finishes to the hinges by conventional hinge plating methods. For instance, during chromium plating operations gas accumulation normally takes place in the bore 24 of the knuckle 20 and tends to escape therefrom, at least in part, through the gap 22 thereby effectively blanketing the metal in the area 18. Since this area is normally one of limited current density, the gas blanketing results in a reduction of the amount of metal plate deposited within that area. The resultant appearance has been categorized as "mooning" due to the configuration of the area of reduced plate coverage.

According to the present invention, the above enumerated manufacturing difficulties have been substantially obviated by incorporating a fixedly located interlocking sleeve bearing 40 within the axial bore 24 of the knuckle 20. The generally cylindrical bearing 40 is characterized by an integral outwardly extending rib 42 positioned within the gap 22 of knuckle 20 along its entire length, thereby not only eliminating "mooning" during plating operations and improving the outward appearance of the hinge, but also preventing relative rotational movement between the bearing 40 and the knuckle 20. The sleeve bearing 40 additionally provides a central aperture 44 of controlled dimensions throughout its length and of fixed relative position to the external surface of knuckle 20 as disclosed in greater detail hereinafter.

As mentioned hereinabove, the bearing 40 is fixedly located in interlocking relationship with knuckle 20. This relationship may be effectuated, according to the preferred embodiments of the present invention, in the manner illustrated in FIGS. 1, 4 and 6. In each of these embodiments the molded bearing 40 compensates for any lack of roundness within the bore 24 by possessing its own pin-receiving aperture 44 and exhibits intimate full peripheral contact with the bore-defining surface of the knuckle. As shown in FIG. 1, the spool-like sleeve bearing 40 integrally possesses terminal outwardly extending flanges 46 which cooperate with the tapered portions 48 of countersunk end surfaces 50 of knuckle 20 to thereby prevent relative axial movement in both directions. It will be appreciated that flanges 46 need not extend beyond the ends of the knuckle but may be located within counterbores located on both ends of the knuckle 20. The embodiment chosen for illustration in FIG. 4, however, accomplishes the same result while concealing the interlocking portions of the respective elements. As shown, the bore 24 of knuckle 20 possesses an annular outwardly extending groove 52 defining shoulders 54, 56 intermediate the ends of knuckle 20. Cooperating with the shoulders 54, 56 to prevent relative axial movement of the bearing 40 within the knuckle 20 is an integral, outwardly extending, annular flange 58. The flange 58 completely fills the groove 52 and reinforces that portion of the rib 42 contiguous with the flange.

As illustrated in FIGS. 1 and 6, the sleeve bearing 40 may extend outwardly beyond the ends of knuckle 20, thereby providing a radial and thrust sleeve bearing. However, it is an advantage of the present invention that the bearing may terminate at the end of knuckle 20 thereby remaining concealed yet effectuating substantial beneficial results within the hinge assembly. Additionally, it should be noted that the molded bearing will compensate for the irregularities and eccentricities of the bore 24 of knuckle 20 and particularly will compensate for misalignment between cooperating interfitting knuckles thereby enhancing the outward appearance of the hinge in a facile and economical manner.

The sleeve bearing 40 may be made from any suitable molding material which possesses sufficient strength and rigidity to effectuate the interlocking function described herein. The material should, however, permit a smooth sliding of the hinge pin within the central aperture 44 of the bearing where intimate contact therebetween is desired. In this regard, plastics have been found extremely useful. For example, particularly good results may be achieved utilizing moldable plastic materials such as nylon, "Delrin," or mixtures thereof with "Teflon."

Referring now to FIG. 6, there is illustrated one form of an apparatus, generally designated 60, for forming the improved molded sleeve bearing 40 within the knuckle 20 of hinge leaf 10. The apparatus 60 generally comprises a lower hinge-positioning block 62 possessing a generally rectangular, transverse slot 64 and a pair of aligning pins 66 located rearwardly of slot 64 and extending upwardly above the block 62. The pins 66 are received by the aligning apertures 68 in the upper hinge-positioning block 70 which also possesses a rectangular transverse slot 72 located so that when the upper and lower blocks are in assembled relationship the respective slots 64, 72 cooperate to define a cavity partially lined by a resilient, rubber-like member 74 preferably made from material such as silicone rubber.

The mounting plate 12 of the hinge leaf possessing the rolled knuckle 20 along the longitudinal edge 16 is inserted into apparatus 60 by placing the knuckle 20 within the slot 64 of the lower block 62 in such a manner that the knuckle contacts both the bottom surface 76 and the front surface 78 of slot 64. The upper block 70 may then be placed on top of the hinge leaf in such a manner that apertures 68 receive aligning pins 66 and the resilient member 74 compressively contacts knuckle 20 effectively sealing longitudinal gap 22. The blocks are then fixedly secured by suitable means (not shown). The member 74 resiliently yields so as to accommodate any misalignment or manufacturing irregularity of the knuckle 20 while at the same time urging the knuckle into intimate contact with fixed surfaces 76, 78 of slot 64.

Extending outwardly from both sides of block 62 and located immediately below rectangular slot 64 is a slide rail 80 whose central axis may be fixedly positioned with respect to the fixed surfaces 76, 78. Mounted on slide rail 80 by means of bearing 82 is a pin carriage member 84 which fixedly maintains a standard core pin 86 in a position parallel to slide rail 80 and also in fixed relative position to fixed surfaces 76, 78. Also slideably depending from rail 80 through bearing 88 is pin-receiving member 90 located on the opposite side of block 62 from pin carriage 84. After assembly of the knuckled hinge between the blocks 62, 70, the pin carriage and pin-receiving members 84, 90 are moved toward each other along rail 80 causing the standard core pin 86 to pass through the bore 24 of rolled knuckle 20 and into the cavity 92 located in pin-receiving member 90.

Members 84 and 90 each are shown to possess recesses 94, 96, respectively, exhibiting a slightly smaller diameter than the external diameter of knuckle 20 thereby providing an enlarged extension of the bore 24 and facilitating the formation of a thrust bearing surface in the sleeve 40.

In forming the sleeve bearing 40, the moldable plastic material in a liquid or flowable form is caused to pass through the injection passage 98, located in the pin-receiving member 90, into the axial bore 24 of knuckle 20 thereby flowing into the slot 22 and conforming to all other irregularities found within the bore. An advantage of the present invention is that the knuckle itself constitutes a major portion of the mold for the bearing, the members 84, 90 constituting only end portions of the mold. Additionally, the flowable material circumscribes standard core pin 86 thereby providing the central aperture 44 of controlled dimensions and fixed position relative to the outer surface of the knuckle 20. Where desirable, the mold and hinge leaf may be suitably heated to assist in the uniform and complete formation of the bearing 40 within the mold prior to solidification of the plastic bearing material. Upon solidification, the apparatus 60 is opened and the hinge leaf and bearing assembly are removed. As mentioned above, the bearing 40 thus assembled possesses an aperture which is fixed relative to the outer surface of the knuckle thereby assuring uniformity of alignment for all of the interfitting knuckles thus produced. It will be appreciated that the core pin 86, and consequently the aperture 44, may be of any suitable configuration so long as the core pin 86 can be removed from the knuckle after the sleeve 40 has been molded in place.

As can be seen from the foregoing description, the molded sleeve bearing produced according to the present invention not only is interlocked within the knuckle 20 against relative axial and rotational movement but, at the same time, compensates for irregularities resulting from the formation of the rolled knuckle and provides a standardized central aperture which is fixedly and precisely located with respect to the hinge knuckle. This assembly thereby facilitates the ready alignment of the interfitting knuckles in a facile and economical manner while obviating the necessity of reaming the central bore or otherwise machining these knuckles to provide an aligned hinge assembly.

As will be apparent to persons skilled in the art, various modifications and adaptations of the structure above described will become readily apparent without departure from the spirit and scope of the invention, the scope of which is defined in the appended claims.

We claim:

1. A method of producing a substantially uniformly plated hinge assembly having a sleeve bearing molded thereto comprising the steps of forming a hinge leaf having a mounting plate and at least one knuckle on the side of said plate, said knuckle possessing a central bore; fixedly positioning the knuckle with respect to a core pin passing through said bore; flowing a moldable material into said bore and around said core pin to form a sleeve bearing having a central aperture aligned with the outer surface of said knuckle and an outer peripheral contour conforming to the surface irregularities of said knuckle bore; and subsequently uniformly plating the hinge leaf of the assembly.

2. A method of producing a hinge assembly having a sleeve bearing molded thereto comprising the steps of forming a hinge leaf having a mounting plate and at least one rolled knuckle on the side of said plate, said knuckle possessing a central bore; fixedly positioning the knuckle with respect to a core pin passing through said bore while resiliently enclosing the knuckle to accommodate for the surface variation of the knuckle; flowing a moldable plastic material into said bore and around said core pin to form a sleeve bearing having a central aperture aligned with the fixedly positioned portions of said knuckle and an outer peripheral contour conforming to the surface irregularities of said knuckle bore.

3. In a method of producing a hinge assembly having a sleeve bearing with a central aperture, the improvement comprising the steps of bendably forming a rolled hinge knuckle by forcing generally flat stock material against an arcuate knuckle-forming surface, said knuckle having a central bore possessing surface irregularities; and flowing a moldable plastic material into said bore to form a sleeve bearing therein with an outer peripheral contour conforming to the surface of said bore.

4. In a method of producing a hinge assembly having a sleeve bearing with a central aperture, the improvement comprising the steps of forming a hinge leaf having a knuckle provided with a central bore possessing surface irregularities and a longitudinally extending slit communicating with the bore; and flowing a moldable material into the bore causing it to flow against the surface of said bore and into said slit to form a sleeve bearing having an outer peripheral contour conforming to the surface of said knuckle bore and an integral outwardly extending rib formed within said slit.

5. In the method of claim 4 the step of subsequently uniformly plating the hinge leaf of the assembly.

6. In a method of producing a hinge assembly having a sleeve bearing with a central aperture and wherein the hinge leaf has a mounting plate and at least one knuckle on the side of said plate, said knuckle possessing a bore having surface irregularities; the improvement comprising the step of flowing a moldable plastic material into the bore through one end thereof to form a sleeve bearing with an outer peripheral contour conforming to said irregularities and locking said sleeve within said knuckle.

References Cited

UNITED STATES PATENTS

| | | |
|---|---|---|
| 1,799,205 | 4/1931 | Wood. |
| 3,015,126 | 1/1962 | Ahlgren _____ 16—136 X |
| 3,087,193 | 4/1963 | Eskridge et al. _____ 16—136 X |
| 3,256,552 | 6/1966 | Sterner _____ 16—128 |
| 2,397,626 | 4/1946 | Shriver _____ 264—269 |
| 2,459,598 | 1/1949 | Stott. |
| 2,704,234 | 3/1955 | Cove et al. _____ 29—149.5 X |
| 2,829,411 | 4/1958 | D'Angelo _____ 29—527 X |
| 2,916,776 | 12/1959 | O'Neill et al. _____ 264—269 X |
| 2,991,740 | 7/1961 | Elkhardt _____ 72—135 X |

JOHN F. CAMPBELL, *Primary Examiner.*

P. M. COHEN, *Assistant Examiner.*

U.S. Cl. XR

16—128; 29—149.5, 528; 72—135; 264—269.